Nov. 16, 1965    G. S. LAWSON    3,217,775
MOTOR VEHICLE PRESSURIZED WHEEL SYSTEM
Filed Nov. 4, 1963    2 Sheets-Sheet 1
FIG. 1
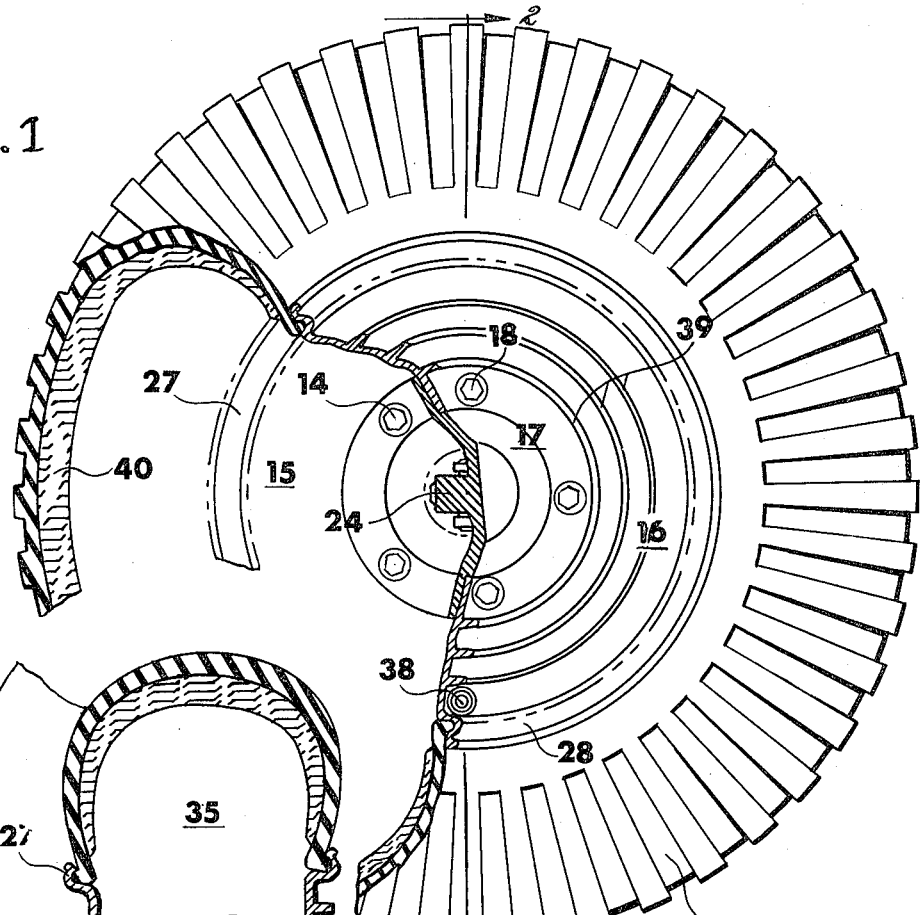
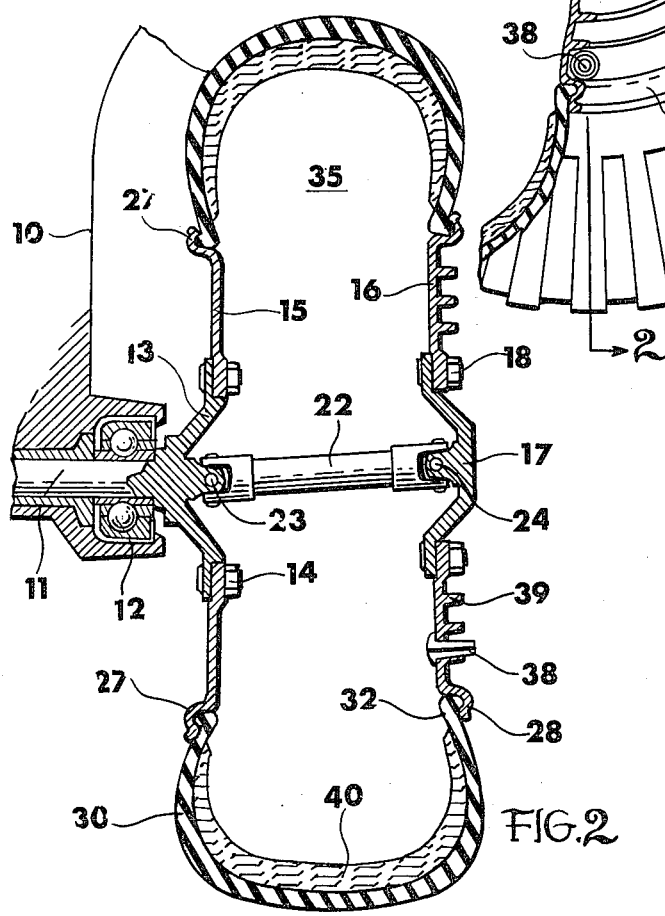
FIG. 2
INVENTOR.
George S. Lawson
BY William L. Fisher
HIS ATTORNEY

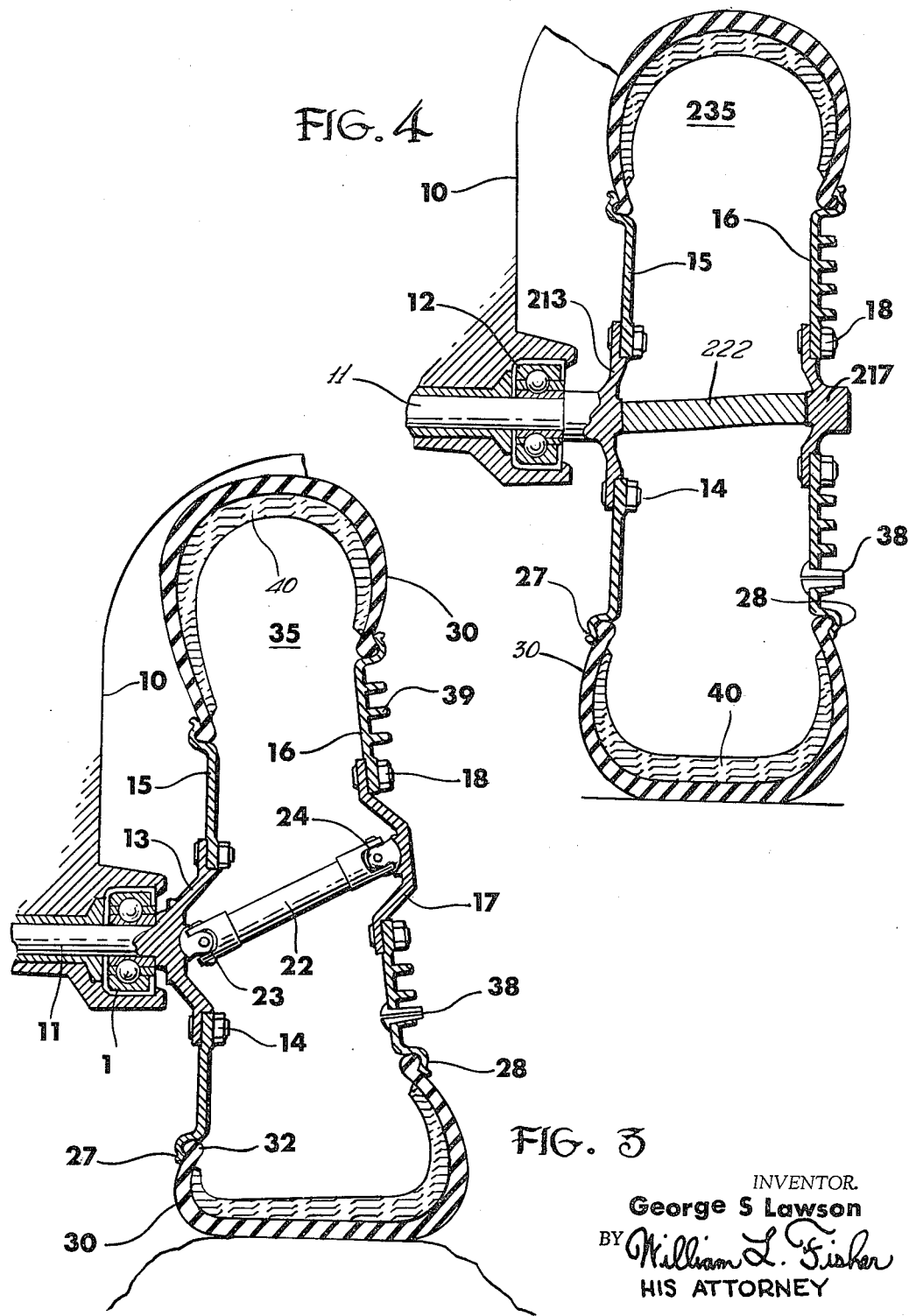

United States Patent Office 3,217,775
Patented Nov. 16, 1965

3,217,775
MOTOR VEHICLE PRESSURIZED WHEEL SYSTEM
George S. Lawson, Macomb County, Mich.
(38217 Huron Pointe Drive, Mount Clemens, Mich.)
Filed Nov. 4, 1963, Ser. No. 321,188
5 Claims. (Cl. 152—9)

This invention relates to a novel pressurized wheel system for motor vehicles.

The invention provides such a system which utilizes axially applied torque transmission between vertically displaceable wheel disks and which replaces the conventional motor vehicle spring-suspension system with an individualized jounce-absorbing mechanism at each wheel.

The foregoing characteristic of the invention and its advantages will appear from the following description taken in conjunction with the accompanying drawings in which:

FIG. 1 is a side elevational view partly in section of a motor vehicle wheel system embodying the invention;

FIG. 2 is a vertical sectional view substantially of the structure of FIG. 1 taken along the line 2—2 thereof but showing the wheel system in a loaded condition;

FIG. 3 is a view similar to FIG. 2 of the same wheel system but showing the same in an impact condition; and FIG. 4 is a view corresponding to FIG. 2 of another embodiment of the invention.

Referring to the drawings in greater detail and first to FIGS. 1–3, 10 indicates a part of the body of a land motor vehicle which may be any one of the conventional passenger, truck or special military types and 11 indicates an axle of the vehicle which is supported for rotation in a bearing 12. Mounted upon the axle 11 is a pressurized wheel system which comprises vertically displaceable inner and outer wheel disks 15 and 16. The inner disk 15 is affixed to the axle 11 via a hub plate 13 fast on the axle 11 as by welding and lugs 14 which removably fasten the disk to the plate 13. The outer disk 16 is removably fastened to a hub plate 17 by lugs 18. A rigid torque transmitting axle extension 22 interconnects the outer wheel disk 16 and axle 11 which extension is affixed, respectively, by universal joints 23 and 24 to the plates 13 and 17. For this purpose one-half of the construction of the respective universal joint is provided centrally of and at the inside of each hub plate which may be dished outwardly as shown to accommodate angular movement of the extension 22. By dishing the inner disk 15 or the plate 13, or both, toward the center of support of the tire, the inner universal joint can be properly located with respect to the center of contact of the tire with the road. The disks 15 and 16 which have on their peripheries bead-retaining structures 27 and 28, respectively, are interconnected at such peripheries by tire means such as the tire 30 which may be as presently made with beads 32 which interlock with the peripheral rim structures 27 and 28. A maximum volume wheel-tire chamber 35 is thus formed which extends continuously and uninterruptedly (except for the negligible displacement of the axle extension 22) in a radial direction within the tire 30 and between the disks 15 and 16. The chamber 35 is pressurized via the valve 38 with air under pressure and when the wheel system is in a loaded condition there is some displacement of the disk 16 upwardly of the disk 15 and angularity of the extension 22 relative to the axle 11 as shown in FIG. 2. The pressurized air volume together with the entire tire 30 reacts against any jounce as shown in FIG. 3. In this figure also is shown such action of the tire and air volume change which, while permitting the outer disk 16 to be displaced upwardly of the inner disk 15, absorb the kinetic energy of impact and limit the angularity of the extension 22 in respect to the axle 11. In reacting to such jounce the outer disk 16 also rotates about a horizontal axis through the universal joint 24 as shown in FIG. 3 and may similarly combine rotation about a vertical axis through such joint. This is from the spreading of the disks at the road area of the tire where it flattens and from the closing of the disks at the opposite tire area. In any event the movement of the outer wheel disk and tire relative to the inner wheel disk is controlled by the axle extension 22 as dictated by the pressurized air within the wheel-tire chamber 35 in reacting to any impact. An annular cooling fin structure 39 is provided on the outer face of the disk 16 while the corresponding area of the inner disk 15 must be available to accommodate braking or steering mechanisms as these are desired for any given application for the wheel system. A differential media 40 such as expanded and solidified foam with interconnecting cells may be incorporated into the system within the confines of the tire 30 to add inertia to the pressurized air volume and to create differential pressures thereof within the wheel-tire chamber 35. A dampening and energy dissipating effect results from the decreased rate of change of such air volume captured within the media 40 from within the open cells of the media 40 to the inside of the tire and back into the open cells of the media 40 and, as illustrated in FIG. 3, since such captured air reacts first in any impact condition the wheel system is selectively devoid of bounce. The wheel system is serviced with the wheel-tire chamber 35 deflated in which condition the outer rim 16 can be disengaged by removing the lugs 18 and pushing hub plate 17 aside to provide access to the lugs 14 so that the wheel and tire can be removed.

In FIG. 4 the axle extension which is designated 222 is a flexible torque transmitting shaft rigidly affixed to both the hub plate 213 for the inner disk 15 and to the hub plate 217 for the outer disk 16. In the case of the last-mentioned embodiment as in that first described the principal torque transmission is axially applied between the vertically displaceable disks through the flexible shaft 222. The shaft 222 has a limited wind-up which does not exceed the natural ability of the tire to absorb it. At all points beyond the limited wind-up of the flexible shaft 222, the axle extension 222 takes all of the torque. The ability of the tire to absorb some of the torque may be increased through special tire construction, e.g., a metal cord tire.

The pressurized wheel system thus described has the ability to absorb road impact individually at each axle terminus to impart maximum stability and equilibrium to the motor vehicle over all road conditions. The internal pressure within the wheel-tire chamber compensates for all external forces on the wheel system. A motor vehicle so equipped with such system has no need of the conventional spring suspension system and thus may be freed of a considerable unsprung mass which is an inherent part of all such conventional suspension systems.

It will thus be seen that there has been provided by the present invention a novel motor vehicle suspension comprising a pressurized wheel system in which thoroughly practical advantages have been successfully achieved. While preferred embodiments of the invention have been shown and described it is to be understood that various changes and modifications may be resorted to without departing from the ambit of the invention as set forth in the appended claims.

What is claimed is:

1. A pneumatic tire and wheel combination comprising: a pair of rotatable wheel disk means including a pair of wheel disks and bead means at an outer periphery of each of said wheel disks, a rotatable driven wheel axle in driving connection with one of said wheel disks for transmitting rotating torque thereto, a tire member having a pair of spaced beads in mating frictional engagement with each of said bead means for connecting the peripheries of said wheel disk means to provide a pressurized chamber between said wheel disks and within said tire member, and a rotatable member for transmitting substantially equal torque axially between said wheel disks upon application of rotary forces thereto by said wheel axle, said rotary member including means permitting relative displacement of said disks generally vertically of one another.

2. The combination of claim 1 in which said rotatable member comprises a rigid non-extensible axle member and includes universal joints connecting said member to said disks.

3. The combination of claim 1 in which said rotatable member comprises a flexible axle member having a limited wind-up, after which said axle member transmits all of said torque between said disks.

4. The combination of claim 1 in which the interior of said tire member is provided with a mass of open cell foam rubber or the like adapted to trap air therein, which is released on impact on the tire, into the pressurized chamber and thereafter returned to the cells in a restricted manner to provide a dampening and energy dissipating effect on the system.

5. A motor vehicle pressurized wheel system comprising: a pair of rotatable wheel disks vertically relatively displaceable, a tire member connecting the peripheries of said disks to provide a pressurized chamber between said disks and within said tire member, the capacity of said pressurized chamber being sufficient to compensate for all external forces imposed on said system, and an axle member universally connected to said disks for transmitting torque equally to the axes of said disks by the application of rotary forces at the hubs thereof, said torque transmitting member including means whereby said disks are rendered displaceable relative to one another at varying load conditions in a substantially vertical direction while holding said disks a predetermined maximum distance apart at the connection points of said axle member to said disks, the interior of said tire being provided with a mass of open cell foam rubber or the like adapted to trap air therein, which is released on impact on the tire, into the pressurized chamber and thereafter returned to the cells in a restricted manner to provide a dampening and energy dissipating effect on the system.

References Cited by the Examiner

UNITED STATES PATENTS

| | | |
|---|---|---|
| 1,257,413 | 2/1918 | Sloper. |
| 2,166,511 | 7/1939 | Witzenmann _____ 152—157 |
| 2,843,171 | 7/1958 | Howe _____ 152—9 |

ARTHUR L. LA POINT, *Primary Examiner.*